United States Patent [19]

Bokstijn

[11] Patent Number: 5,445,449
[45] Date of Patent: Aug. 29, 1995

[54] STORAGE DEVICE

[75] Inventor: Tom Bokstijn, Volendam, Netherlands

[73] Assignee: Tombo Trading International B.V., Volendam, Netherlands

[21] Appl. No.: 189,327

[22] Filed: Jan. 31, 1994

Related U.S. Application Data

[63] Continuation-in-part of Ser. No. 859,404, May 27, 1992, abandoned.

[51] Int. Cl.⁶ .............................................. A47F 1/04
[52] U.S. Cl. .................................... 312/9.31; 312/327
[58] Field of Search ............... 312/9.29, 9.31, 9.35, 312/9.45, 9.46, 9.23, 249.7, 299, 205, 327, 349.2, 349.3

[56] References Cited

U.S. PATENT DOCUMENTS

| | | | |
|---|---|---|---|
| 1,359,668 | 11/1920 | Buchanan | 312/249.3 |
| 2,525,165 | 10/1950 | Bosseita | 312/9.31 |
| 4,108,511 | 8/1978 | Spragg | 312/9.35 |
| 4,753,343 | 6/1988 | Flynn | 312/9.31 |

FOREIGN PATENT DOCUMENTS

| | | |
|---|---|---|
| 0267538 | 11/1987 | European Pat. Off. |
| 2258687 | 1/1974 | France . |
| 2307410 | 8/1974 | Germany . |
| 3301680 | 7/1984 | Germany . |
| 3514171 | 10/1986 | Germany . |

OTHER PUBLICATIONS

IBM Tech Disclosure Bulletin vol. 15, No. 6, Nov. 1972, R. Billings et al.

*Primary Examiner*—Kenneth J. Dorner
*Assistant Examiner*—Gerald A. Anderson
*Attorney, Agent, or Firm*—Bachman & LaPointe

[57] ABSTRACT

A storage device for thin, flat objects, includes a housing for supporting the device on a support surface, a stationary magazine non-rotatably mounted in said housing, said stationary magazine having a plurality of radially oriented storage spaces, a wall for retaining said objects in said storage spaces, said wall including a wall having an opening, said wall being at least partially rotatable relative to said storage spaces so as to selectively align said opening with a desired storage space for insertion and removal of an object and a removal assembly attached to said wall for removing objects from said storage spaces through said opening.

13 Claims, 3 Drawing Sheets

STORAGE DEVICE

CROSS REFERENCE TO RELATED APPLICATION

This application is a continuation-in-part of U.S. patent application Ser. No. 07/859,404 filed May 27, 1992 now abandoned.

BACKGROUND OF THE INVENTION

The present invention relates to a storage device for thin, flat objects, such as compact discs, comprising a stationary magazine with storage spaces extending along the outer periphery essentially at right angles thereto towards the center thereof, and provided with means for retaining said objects, at least at one side bounded by an at least partially rotatable wall.

Such a storage device is known from EP-A-0,263,496. It discloses a magazine of a player in which the compact discs are placed in a circular manner. Opposite-lying compact discs are spaced apart at such a distance that a conveyor can move between them. This conveyor comprises a cylindrical element in which the compact discs can be inserted or out of which they can be slid. This conveyor element can be brought through rotation in front of the compact disc concerned, and the latter can be picked up therein and conveyed further to the player. Such a magazine is very complex and expensive to produce, and can be used properly only in conjunction with a fully automated playing system. Such a device cannot be used in practice merely for storing compact discs.

The object of the present invention is to provide a storage device for objects which can be achieved much more simply and therefore can also be put on the market solely as a magazine.

SUMMARY OF THE INVENTION

This object is achieved in the case of a storage device of the type described above in that the at least partially rotatable wall has an opening, which is to be brought into line with the storage spaces for the insertion and removal of said objects, and in that removal means acting upon the side of the objects opposite the side thereof adjoining said opening are connected to the rotatable wall.

Unlike the state of the art, the compact disc is now not removed towards the center of the magazine, but is moved at right angles to this plane. Such a device is particularly simple to produce, because only a stationary magazine is necessary, with only one outer wall provided with an opening which can be taken into different positions to release the different objects. The opening in this case can be so large that it is possible to place the fingers in it in order to be able to take hold of the objects. This does, however, have the disadvantage that dust and the like can enter the magazine as a result. For that reason, according to a further embodiment, provision is made for removal means which comprise a rod system connected to the rotatable wall, the engaging end of which system must be taken opposite the opening of the rotatable wall. This means that it is adequate to have an opening which corresponds to the dimensions of the object which is to be stored. If this object has to be taken out, it can be brought out partially by operating the removal means, to such an extent that it can be gripped further by hand.

In order to operate the removal means for bringing out the objects, they can be fitted near the rotatable wall. This makes it possible to operate both the rotatable wall and the removal devices with one hand.

In order to prevent the removal means from engaging in the space between two objects, in a preferred embodiment of the invention indexing means, permitting operation of the removal devices only in specific discrete positions, are present.

For the facilitation of the accurate positioning of the opening, and in order to be in a position to remove the correct object immediately, in a preferred embodiment indicator means are present for determining the position of the rotatable wall relative to the remainder of the device.

According to a further advantageous embodiment, the storage spaces comprise a toothed part extending along the outer periphery of the storage device and a part lying coaxial thereto which lies therein and has the same number of teeth. Such teeth can be made particularly simply of strip material. Such a strip material is made in large quantities for all kinds of drive belts.

BRIEF DESCRIPTION OF THE DRAWINGS

The invention will be explained in greater detail below with reference to an example of an embodiment shown in the drawing, in which.

DETAILED DESCRIPTION

Figure 1:
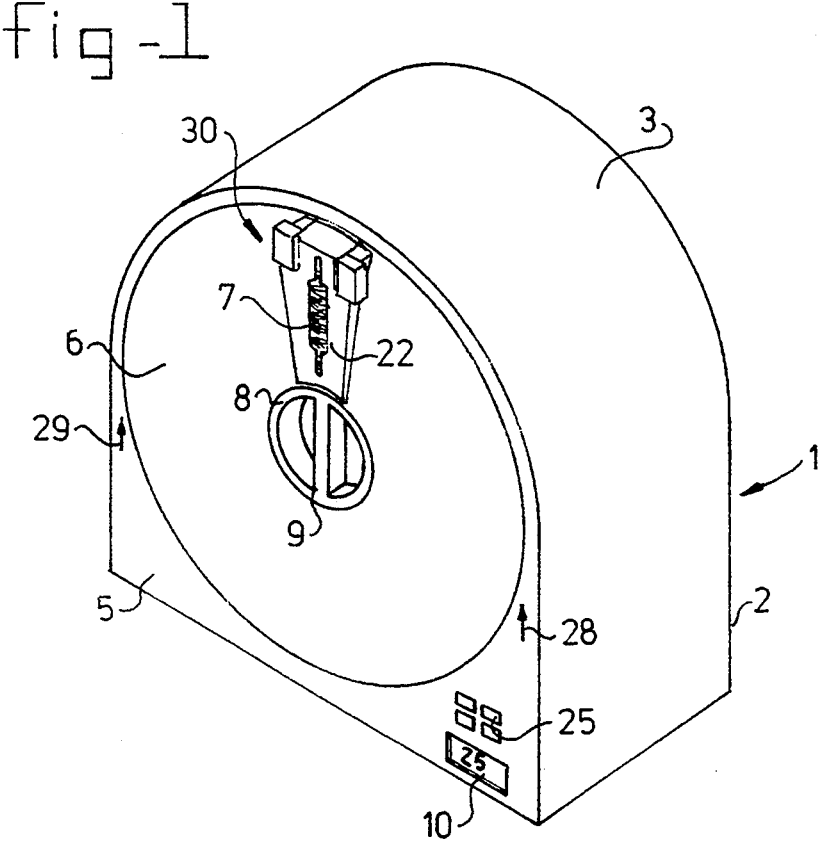
FIG. 1 shows a perspective external view of the device according to the invention.

The storage device according to the invention is shown in FIG. 1 and is indicated in its entirety by 1. It comprises a box-shaped body or housing 2 provided with a top/side wall 3, a rear and bottom wall (not shown), and a front wall 5. A rotatable wall part 6, provided with a slit-shaped opening 7 and a recess 8 over which a bridge 9 extends, is placed in the front wall 5. Wall part 6 is rotatable relative to front wall 5 through gripping bridge part 9 with the fingers. Of course, numerous other configurations are suitable for properly orienting wall 6. For example, a simple knob structure could be provided which would allow rotation of wall 6 as desired.

Said knob or ridge 9, it is noted, is preferably mounted on a shaft 21 journalled through wall 6. Rods 19, 20 are preferably attached to shaft 21, (see FIG. 2) so that rotation of wall 6 arranges rod 20 behind or adjacent to a desired storage space. Once properly located, pulling on knob 9 draws rod 20 into the selected storage space so as to eject a disc 15 stored therein through opening 7 of wall 6.

As shown, a numerical display 10 is also present. By means of transmission devices (discussed below) the position of the rotatable wall part 6 is displayed by the display means 10. It is possible to make this transmission either mechanical or electrical. A keyboard 25, by means of which the number or a brief designation of the desired stored object can be entered is also present.

Illuminable arrow indicators are also provided in the front wall 5.

Figure 2:
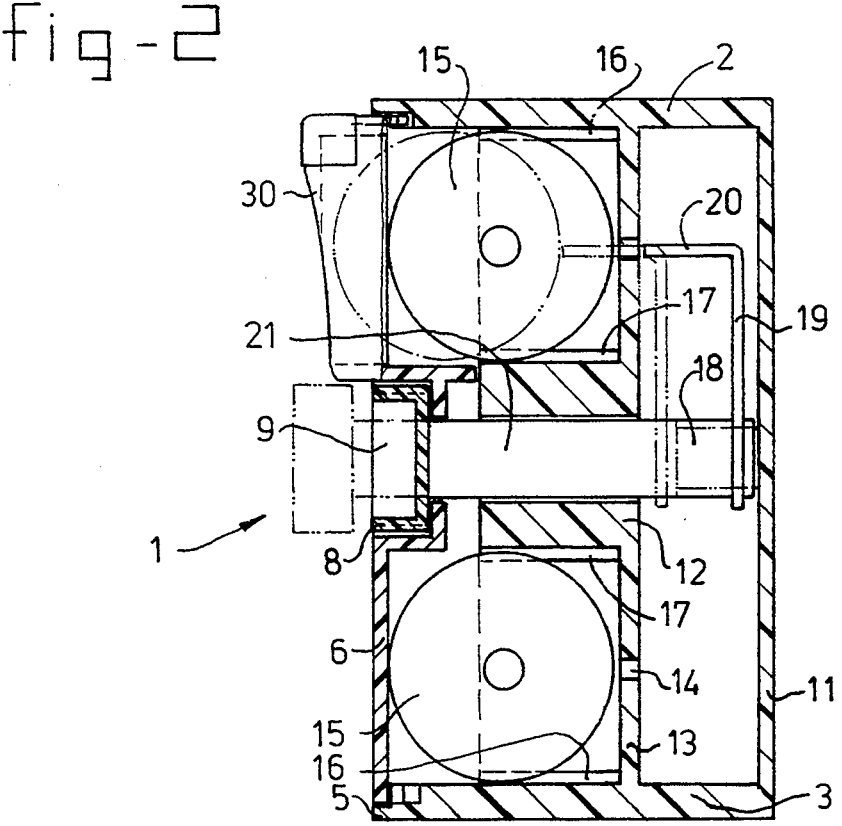
FIG. 2 shows a side view in cross-section of the device illustrated in FIG. 1.

FIG. 2 shows the device according to FIG. 1 in side view. The rear wall 11 is also shown here. It can be seen that a concentric ring or wall 12 connected to the rear wall 11 is present. The connection takes place by means of a plate 13 provided with perforations or openings 14. Wall 12 and plate 13 bound spaces for the storage of objects such as compact discs 15. These are held in place through the fact that teeth 16 are provided along the inside of the top/side wall 3. Teeth 17 are fitted on wall 12. The pitch of the various teeth is such here that an equal number of slits are bounded for accommodating compact discs 15. Such teeth can be achieved, for example, by fitting a strip material provided with teeth.

Figure 3:
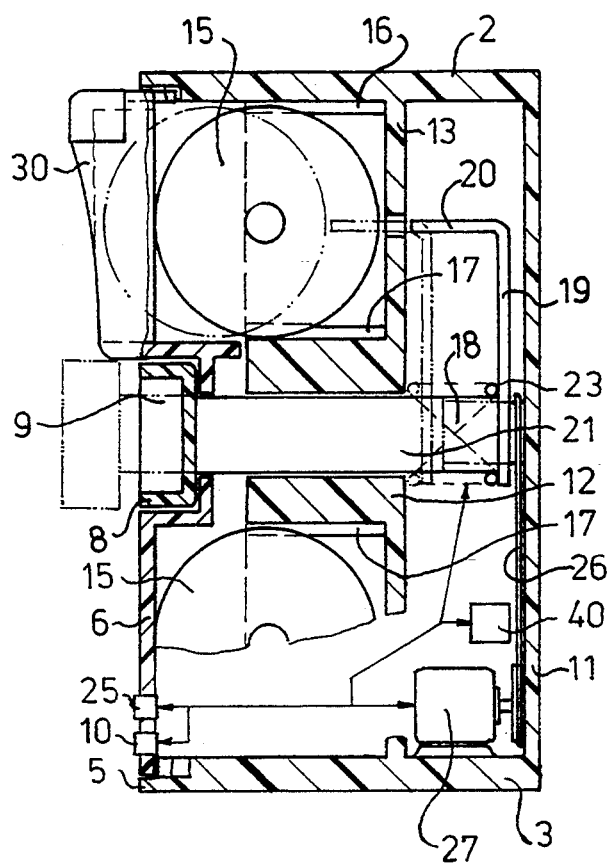
FIG. 3 shows a view corresponding to FIG. 2 of a further embodiment.

FIG. 2 also shows that recessed part 8, in which bridge part 9 is fitted, can be brought outwards relative to the rotatable wall part 6. In the non-use state this recessed part 8 is, however, moved inwards by a spring 23 (FIG. 3). A bush 18, provided with a rod system 19, 20, is connected to part 8. Moving part 8 outwards will cause part 20 to move to the left in FIG. 2. If part 20 is situated in front of an opening 14, it can go into the space for compact discs, as a result of which compact disc 15 in FIG. 2 is moved to the left and can be moved out of opening 7 in wall 6. This makes it possible to remove compact discs from the storage device in a particularly simple way. They can be inserted simply by pushing inwards. In order to prevent an excessively greater force from being exerted on rod 20 through the fact that it is not in front of an opening, bush 18 can be provided with teeth which mesh with corresponding teeth provided in the fixed part of the storage device, so that recessed part 8 can be moved outwards only in discrete positions. This indexing will be further described below. After the desired compact disc 15 is entered by means of keyboard 25, the direction in which bridge part 9 must be rotated will be indicated by arrow 28 or arrow 29 being illuminated.

FIG. 3 shows another embodiment of the invention. An electric motor 27 is provided here with the aid of a toothed belt or chain 26 which is connected to the rotary drum. After the desired compact disc is keyed in on keyboard 25, slit 7 will be placed in the correct way relative to the magazine by means of motor 27. In order to avoid the entry of dust, slit 7 can be provided with a dust seal, such as brush hairs 22 (see FIGS. 1 and 5).

Figure 4:
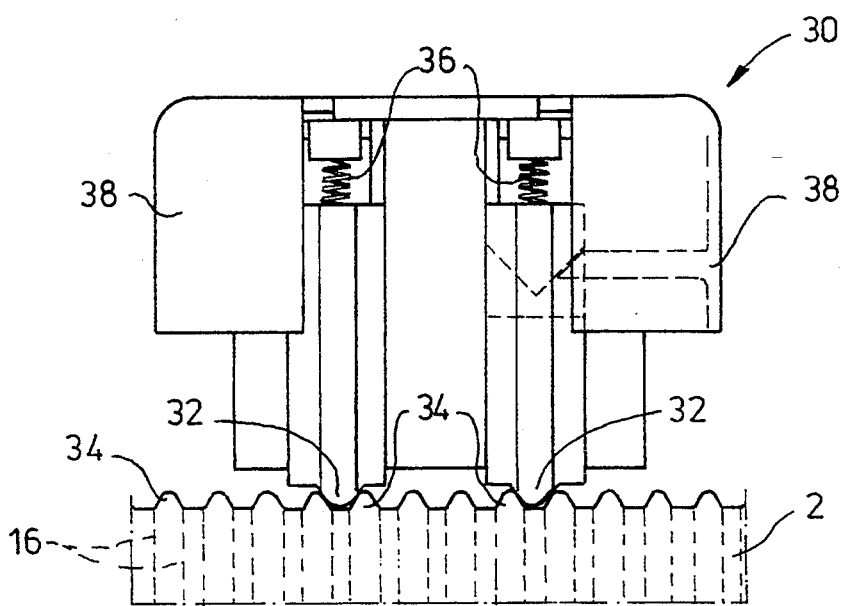
FIG. 4 shows an end view of the indexing structure of the invention.
Figure 5:
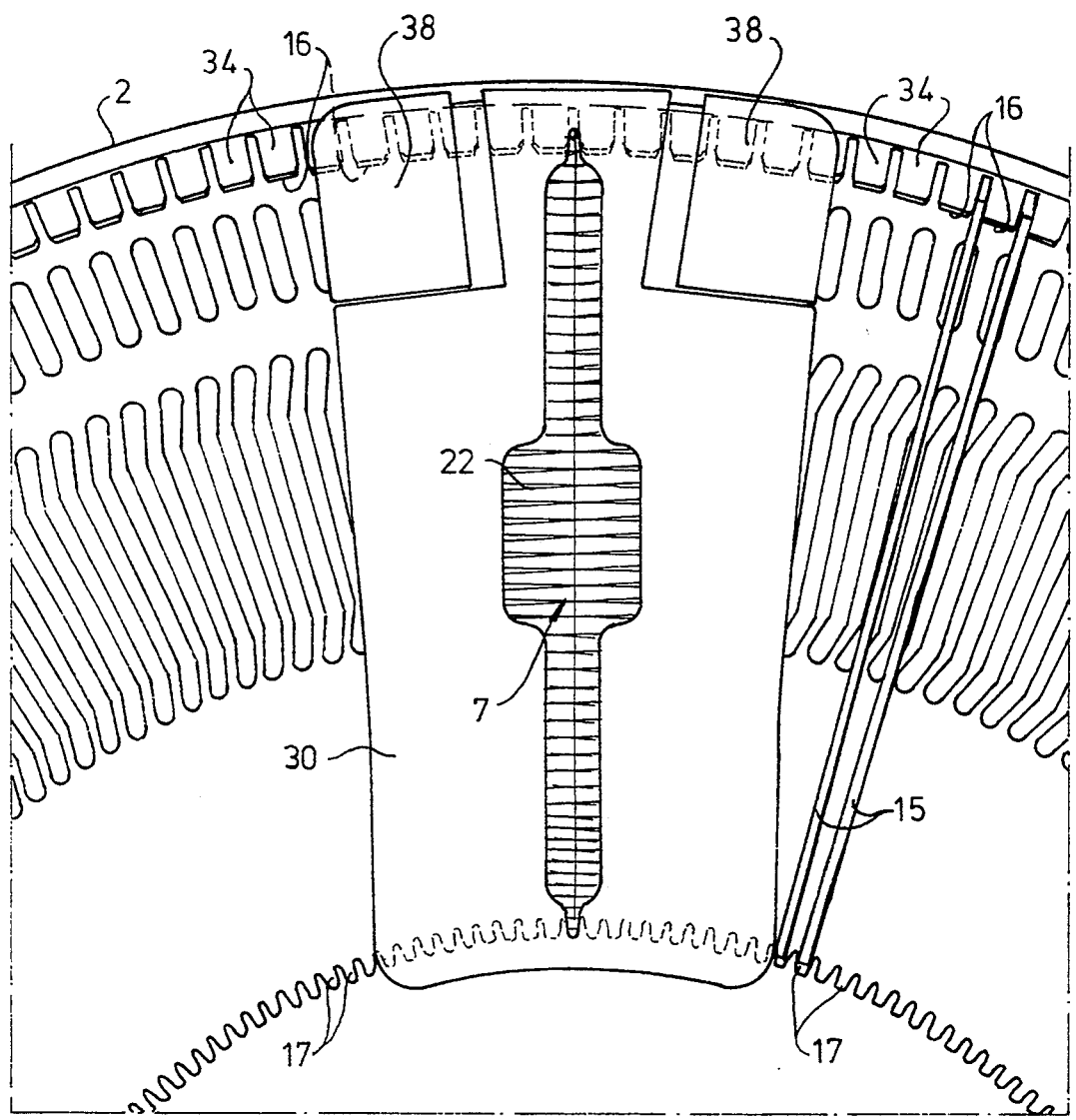
FIG. 5 shows a side view of a portion of the apparatus of the invention including the indexing structure.

As set forth above, a feature of the present invention is the indexing of wall 6 relative to housing 2 so that opening 7 is arranged opposite a desired storage space. In accordance with the invention, an indexing assembly 30 is provided. Assembly 30 serves to engage wall 6 relative to housing 2 only in positions where opening 7 is aligned with a storage space. FIGS. 4 and 5 show end and side views of assembly 30. Assembly 30 includes one or more teeth 32 slidably mounted for engagement with housing 2. Housing 2 may preferably be provided with a plurality of substantially laterally oriented teeth 34 which may suitably be aligned with or may be extensions of teeth 16. Teeth 32 are also preferably arranged on assembly 30 so that when they engage teeth 32, opening 7 is aligned with a storage space. In this regard, teeth 32, 34 preferably have bevelled or sloped sides, and teeth 32 may preferably be biased for example by springs 36 toward teeth 34. In this way, springs 36 will urge teeth 32 into engagement with teeth 34 and, thereby, will provide any slight radial adjustment of the position of wall 6 which may be necessary so that opening 7 will be aligned with a storage space at all times.

Assembly 30 may also include push member 28 which may be arranged for use in withdrawing teeth 34 so that wall 6 can be rotated to a new desired position. As before, upon release of push members 38, springs 36 engage teeth 32 with teeth 34 so as to ensure alignment of opening 7 with a selected storage space.

Push members 38 may be associated with teeth 32 through properly arranged cam surfaces as shown in hidden lines in FIG. 4 so as to transmit squeezing of members 38 into withdrawal of teeth 32, as desired. Numerous other arrangements could of course be utilized.

As set forth above, storage spaces are defined by inwardly directed teeth 16 and outwardly directed teeth 17, positioned on or within housing 2. Teeth 16, 17 may be formed integrally on housing 2, or may be partially or entirely separate elements mounted to housing 2.

In accordance with the invention, teeth 16, 17 are preferably spaced so as to provide a space suitable for storing compact discs 15. It is noted, of course, that the spacing of teeth 16, 17 could also be selected so that storage spaces are suitable for cassettes, records, or numerous other thin substantially flat objects as desired.

The stationary nature of housing 2 provides a solid and reliable device while rotation of wall 6 provides a simple and effective means for accessing stored objects.

As set forth above, display 10 illustrates, for example numerically, the identity of the particular storage space with which opening 7 is aligned. The proper number is preferably illustrated by a transmission 40 which associates position of wall 6 with the appropriate identity or number. Transmission 40 (shown schematically in FIG. 3) may be mechanical or electrical in nature and may, for example, include an electrical storage device for associating a particular number with a particular position and vice versa.

Keypad 25, as set forth above, may also be included for entering the identity of a desired storage space. By means of transmission 40, the entered identity could be translated into a signal for operating one of arrows 28, 29 to advise the use which direction to turn wall 6. In the embodiment of FIG. 3, transmission 40 could be adapted to signal motor 27 to automatically rotate wall 6 and opening 7 to the desired storage space.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A storage device for thin, flat objects, comprising:
   housing means for supporting the device on a support surface;
   a stationary magazine non-rotatably mounted in said housing, said stationary magazine having a plurality of radially oriented storage spaces;
   wall means for retaining said objects in said storage spaces, said wall means including a wall having an opening, said wall being at least partially rotatable relative to said storage spaces so as to selectively align said opening with a desired storage space for insertion and removal of an object; and removal means attached to said wall for removing objects from said storage spaces through said opening.

2. A storage device according to claim 1, wherein said removal means comprises a rod system associated with said wall and having an engaging end for engaging and removing objects, said engaging end being aligned opposite to said opening of said wall.

3. A storage device according to claim 1, wherein said removal means further includes means for operating said removal means to remove an object from a storage space.

4. A storage device according to claim 1, wherein said stationary magazine comprises a plurality of inwardly directed radially oriented teeth and a like number of outwardly directed radially oriented teeth, said inwardly directed and outwardly directed teeth defining said storage spaces.

5. A storage device according to claim 1, wherein said storage spaces are radially arranged around a substantially horizontal axis.

6. A storage device according to claim 1, further comprising indexing means for selectively aligning said opening with a desired storage space.

7. A storage device according to claim 6, wherein said indexing means comprises at least one tooth member movably mounted relative to said storage spaces and movable between an engaged position wherein said opening is aligned with a storage space and said wall is held against rotation, and a disengaged position wherein said wall is rotatable relative to said housing to a desired location.

8. A storage device according to claim 7, wherein said indexing means is mounted to said wall and said tooth member engages with a storage space when in said engaged position.

9. A storage device according to claim 8, wherein said indexing means further includes biasing means for urging said tooth member toward said engaged position.

10. A storage device according to claim 7, wherein said housing further includes a plurality of substantially laterally oriented teeth and wherein said tooth member engages with said laterally oriented teeth when in said engaged position.

11. A storage device according to claim 10, wherein said laterally oriented teeth are aligned with said storage spaces whereby said tooth member, when in said engaged position, engages said wall so that said opening is aligned with a desired storage space.

12. A storage device according to claim 1, further including indicator means for identifying a storage space when said storage space is aligned with said opening.

13. A storage device according to claim 12, wherein said indicator means comprises transmission means for associating position of said wall relative to said housing with a storage space aligned with said opening, said indicator means being associated with said transmission means.

* * * * *